United States Patent [19]

Hsu

[11] 4,215,667
[45] Aug. 5, 1980

[54] PORTABLE COOKING UNIT WITHOUT FUEL SUPPORTING AND VENTILATING PLATE

[76] Inventor: Cheng H. Hsu, No. 2, Lane 578, Pei-An Rd., Taipei, Taiwan

[21] Appl. No.: 908,654

[22] Filed: May 23, 1976

[51] Int. Cl.² .............................................. F24C 1/16
[52] U.S. Cl. ................................ 126/9 R; 126/25 AA
[58] Field of Search ............. 126/25 R, 25 A, 25 AA, 126/9 R, 9 A, 9 B, 26, 29

[56] References Cited

U.S. PATENT DOCUMENTS

| | | | |
|---|---|---|---|
| 3,131,685 | 5/1964 | Bergfield | 126/25 AA |
| 3,191,592 | 6/1968 | Lorbacher | 126/9 R |
| 3,279,453 | 10/1966 | Norehad | 126/9 A |
| 3,288,050 | 11/1966 | Saiki | 126/25 R |
| 3,393,670 | 7/1968 | Psarris | 126/25 R |
| 3,511,222 | 9/1968 | Miller | 126/9 R |
| 3,611,912 | 10/1971 | Choc | 126/25 R |
| 3,857,380 | 12/1974 | Hansman | 126/25 A |

Primary Examiner—Samuel Scott
Assistant Examiner—G. Anderson
Attorney, Agent, or Firm—Cushman, Darby & Cushman

[57] ABSTRACT

A portable cooking unit without a fuel supporting and ventilating plate comprising a circular oven body wherein several piles are extended upwards from the over bottom to support the charcoal or fuel thereon so as to replace the conventional fuel supporting and ventilating plate and having a spindle threaded on its lower portion is screwed into a bracket having an inverted U shape which is fixed onto the central bottom of said oven. The spindle is made a D shaped notch on its upper portion so as to engage with a D shaped hole on the grill. So that the grill may be rotated with the spindle to adjust its height. Three legs are inserted into said oven bottom to keep the oven a distance above the ground. An U-shaped handle is provided on the oven body waist and a clamping clip is made to bind the grill with the oven so that the cooking unit and accessories may be carried like a hand bag.

10 Claims, 4 Drawing Figures

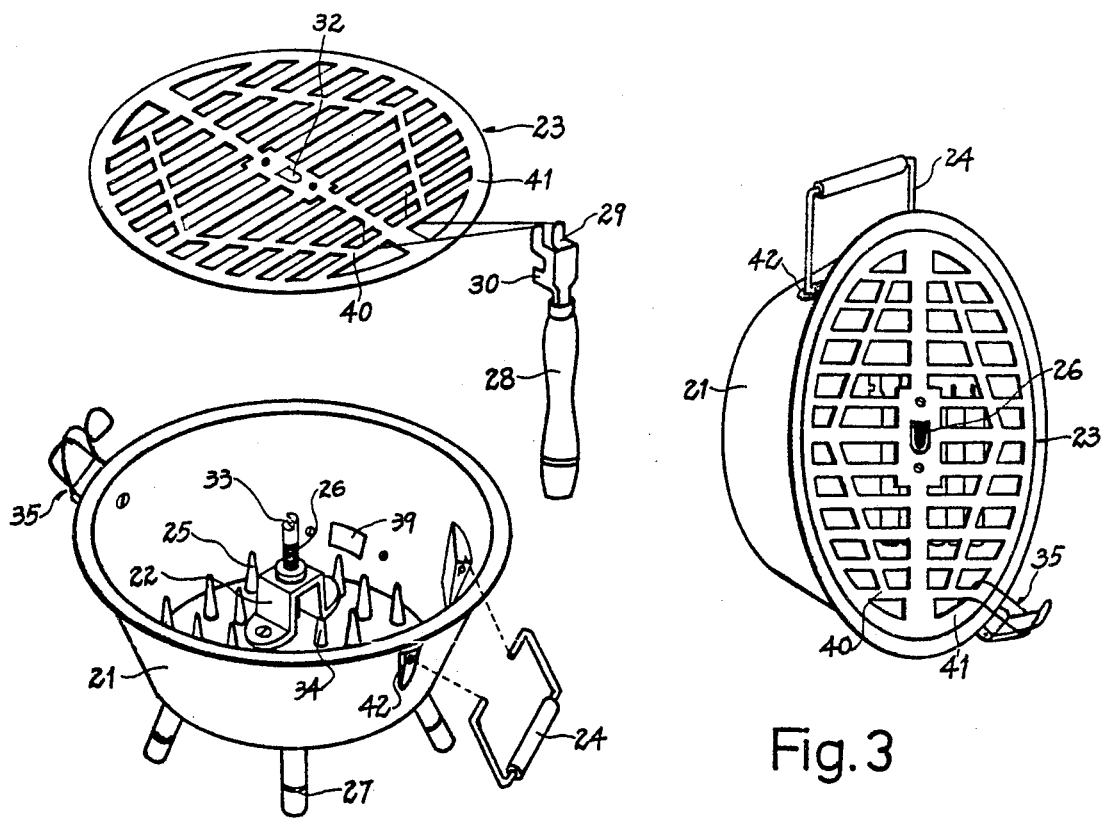
Fig.1
Fig.3
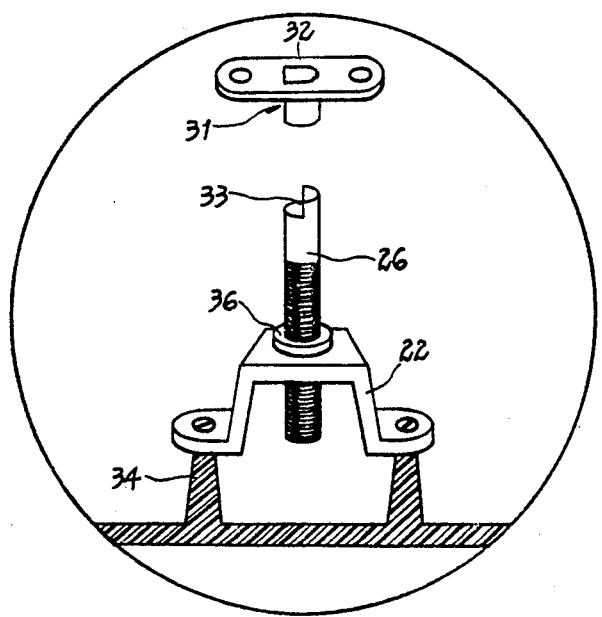
Fig.2
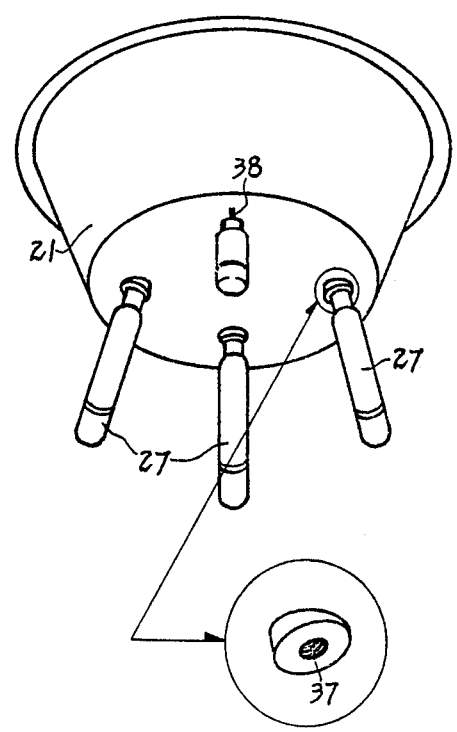
Fig.4

4,215,667

PORTABLE COOKING UNIT WITHOUT FUEL SUPPORTING AND VENTILATING PLATE

BACKGROUND OF THE INVENTION

The present invention relates to a portable cooking unit without a fuel supporting and ventilating plate, particularly to a cooking unit wherein several piles are extended upwards from the oven bottom to support the charcoal or other fuel and a rotating spindle is provided from the oven bottom so as to adjust the height of the grill.

The conventional cooking unit comprises a grill mounted on the oven body and a fuel supporting and ventilating plate is necessary to be provided on the oven bottom so that the fuel or charcoal can be loaded on said plate and the air may be ventilated through the plate holes so as to aid the combustion of charcoal. Such features increase the production cost of oven and cause inconvenience in handling the oven. Also, the conventional cooking unit comprises a grill hung on a spindle or bracket mounted on the oven. Such a spindle is not retractable and will affect the beauty of oven appearance and obstruct the baking material thereon.

The present inventor has found these defects and researched to disclose the present invention.

SUMMARY OF THE INVENTION

One object of the present invention is to provide a portable cooking unit in that several extended piles are provided to support the charcoal and to serve the ventilation for the fuel so as to eliminate the conventional supporting plate means.

A further object of the present invention is to provide a portable cooking unit wherein a grill is mounted on a spindle which is threaded on its lower portion and screwed into a bracket fixed on the oven bottom so that the height of the grill may be adjusted by rotating the spindle either upwards or downwards to meet the practical baking requirement or to allow the charging or make-up of charcoals.

Further features and object of the present invention may be hereinafter described as the specification and drawings.

BRIEF DESCRIPTION OF THE DRAWINGS

FIG. 1 is a perspective drawing of all parts of the cooking unit of the present invention.

FIG. 2 is an elevation drawing of a screwed spindle and its bracket in accordance with the present invention.

FIG. 3 is a perspective drawing of the cooking unit as binding the grill with the oven body.

FIG. 4 is a drawing showing the supporting legs of the present invention.

DESCRIPTION OF THE PREFERRED EMBODIMENT

As shown in the drawings from FIGS. 1 through 4, the present cooking unit comprises a circular oven body 21 in which a plurality of extended piles 25 are provided on the oven bottom whose height, spacing and distance meet the practical application to allow the air from the port 39 to penetrate the charcoal for enhancing combustion. Two columns 34 are provided centrally on the oven bottom for fixing by screws a bracket 22 of inverted U shape. A vacuum cylinder 36 is provided atop said bracket 22. A spindle 26 having a D-shaped notch 33 on its upper portion and lower threaded portion is screwed into cylinder 36. Grill 23 is provided centrally with an auxiliary square portion 31 having a D-shaped hole which coincides with the D-shaped notch 33 on the upper portion of movable spindle 26 so that, whenever rotating said grill 23, the movable spindle 26 may be raised or lowered to adjust the suitable height.

Three screw holes 37 are made on said oven body 21. By fixing three supporting legs 27 having screwed ends onto said holes 37, said oven body will stand with a distance above the ground. Two recessed holes 42 are formed on the waist portion of said oven body 21 for fixing a U shaped handle 24. A clamping clip 35 is provided on other side of handle 24 to bind the grill 23 with oven body 21 for handling usage like carrying a handbag.

For carrying or operating said grill 23, a handle 28 is made with a front hook 29 like an elephant's nose and a back teeth 30, both formed integral on the front portion of grill handle 28 from which said front hook 29 may insert into the grill grate 40 to hold said grate 40; back teeth 30 may back up said grill edge 41 so as to handle said grill 23.

The present cooking unit may be made from cast iron or fabricated by press moulding of steel plate.

When using said unit, the clip 35 may be disengaged, the grill 23 removed and rotate the spindle 26 rotated to the suitable height, and then the three legs 27 fixed into holes 37. After adding and igniting the charcoal, grill 23 is inserted onto spindle 26 for baking or cooking. For making up the charcoal, the grill handle 28 is used to raise the grill 23 by engaging hook 29 with said grate 40 and teeth 30 with said grill edge 41.

The structure and operating principles of the present invention are described as above-mentioned. Any modifications or changes, well known in the art, derived from the foregoing description or the preferred embodiment, are still within the scope of the present invention.

I claim:

1. A portable cooking unit without a fuel supporting and ventilating plate comprising: a circular oven body having a bottom and a side wall extending upwardly from said bottom; several extended piles extending upward from said oven body bottom; a bracket of inverted U-shape fixed at said oven body bottom and extending upwardly therefrom; a spindle having threads on its lower portion vertically screwed into said inverted U-shaped bracket so that said spindle moves vertically when rotated in said bracket, said spindle having a non-circular top end and a free bottom end disposed above said oven body bottom; means for preventing said spindle bottom end from being lowered below said oven body bottom; an U-shaped oven handle mounted to said side surface, at least three threaded supporting legs screwed to said oven body bottom; a grill having a central auxiliary plate, said auxiliary plate having a hole therein for receiving said spindle top end, said spindle top end being vertically supporting said auxiliary plate and grill, said grill being vertically removable from said spindle top end, said spindle top end including means for preventing rotation of said grill about said spindle so that when said grill is rotated, said spindle is rotated and said grill and said spindle are raised and lowered relative to said U-shaped bracket; a grill handle having a pair of opposing engaging hooks and teeth for moving said grill onto and off of said spindle; and a clamping clip for releasably binding said grill with said oven body.

2. A cooking unit according to claim 1, wherein said several extended piles are cone-shaped, said cooking unit further comprising two bolts fixing said bracket of inverted U-shape onto said oven body bottom, said oven body having formed in the waist portion thereof two recessed holes for inserting said oven handle, screw holes being formed in said oven body bottom for fixing said support legs, an air receiving hole being formed on the oven body side wall below the top of said cone shaped piles.

3. A cooking unit according to claim 1, wherein said auxiliary plate hole includes a D-shaped portion at its upper end; said spindle top end comprising a D-shaped notch in said plate.

4. A cooking unit according to claim 1, wherein said grill handle comprises a round bar and a front portion having a pair of side by side hooks, insertable into said grill and having vertically extending teeth for engaging the outer edge of said grill so that said grill may be removed from said spindle.

5. A cooking unit according to claim 1, wherein said movable supporting legs each include an insulated bar and a threaded end for assembling on or dismantling from said oven body bottom.

6. A portable cooking unit without a fuel supporting and ventilating plate comprising: a circular oven body having a bottom and a side wall extending upwardly from said bottom; support means, mounted to said oven body, for supporting a threaded spindle; a spindle having threads on its lower portion, vertically screwed into said support means such that said spindle moves vertically when rotated in said spindle support means, said spindle having a top end and a free bottom end disposed above said oven body bottom; means for preventing said spindle bottom end from being lowered below said oven body bottom; means for supporting said oven body; and a grill having a central auxiliary plate, said auxiliary plate having a hole therein for receiving said spindle top end, said spindle top end vertically supporting said auxiliary plate and grill, said spindle top end including means for preventing rotation of said grill about said spindle so that when said grill is rotated, said spindle is rotated and said grill and said spindle are raised and lowered relative to said spindle support means.

7. A cooking unit as in claim 6 further comprising a plurality of cone-shaped piles extending upwardly from said oven body bottom.

8. A cooking unit as in claim 7 wherein said oven body support means comprises at least three legs having threaded ends for screwing into said oven body bottom.

9. A cooking unit as in claim 6 wherein said spindle support means comprised an inverted U-shaped bracket having a threaded hole for receiving said spindle threads, mounted to the central portion of said oven body bottom.

10. A cooking unit as in claim 6 or claim 9 wherein said grill is vertically removable from said spindle top end.

* * * * *